US012397358B2

(12) United States Patent
Beckman et al.

(10) Patent No.: US 12,397,358 B2
(45) Date of Patent: Aug. 26, 2025

(54) SYSTEM AND METHOD FOR DEEP DRILLING INTO A PET PANEL AND PET PANEL INCLUDING A DEEP DRILLED HOLE

(71) Applicant: MillerKnoll, Inc., Zeeland, MI (US)

(72) Inventors: David J. Beckman, Holland, MI (US); Sathish Sampath, Holland, MI (US)

(73) Assignee: MillerKnoll, Inc., Zeeland, MI (US)

( * ) Notice: Subject to any disclaimer, the term of this patent is extended or adjusted under 35 U.S.C. 154(b) by 496 days.

(21) Appl. No.: 17/734,805

(22) Filed: May 2, 2022

(65) Prior Publication Data
US 2023/0347420 A1  Nov. 2, 2023

(51) Int. Cl.
*B23B 49/00* (2006.01)
*B23B 41/00* (2006.01)
*B23B 41/02* (2006.01)

(52) U.S. Cl.
CPC .............. *B23B 49/00* (2013.01); *B23B 41/00* (2013.01); *B23B 41/02* (2013.01)

(58) Field of Classification Search
CPC ....... B23B 41/02; B23B 45/003; B23B 47/28; B23B 47/287; B23B 49/02; B23B 2215/64; B23B 2226/27; B23B 2226/61; B23B 35/00; B23B 51/04
See application file for complete search history.

(56) References Cited

U.S. PATENT DOCUMENTS

| 2,606,615 | A | * | 8/1952 | Pevey | ................. B23B 51/0413 408/205 |
| 2005/0265799 | A1 | * | 12/2005 | Hartsfield | ................. B25B 5/16 408/110 |
| 2006/0263154 | A1 | * | 11/2006 | Fuller | ..................... B23B 41/02 408/103 |
| 2010/0047027 | A1 | * | 2/2010 | Wrobel | .................. B23Q 5/402 408/69 |

FOREIGN PATENT DOCUMENTS

| KR | 101885637 B1 * | 2/2018 | .......... B23B 45/003 |
| WO | WO-2013191895 A1 * | 12/2013 | .......... B23B 47/288 |

OTHER PUBLICATIONS

Steelcase, Flex Collection, Product Literature, Dec. 2019, 16 Pages.

* cited by examiner

*Primary Examiner* — Sunil K Singh
*Assistant Examiner* — Eric Daniel Whitmire
(74) *Attorney, Agent, or Firm* — Michael Best & Friedrich LLP

(57) ABSTRACT

A method for deep drilling into a panel composed of compressed polyester fibers includes providing a guide system, aligning the guide system with the panel, applying a force to a face of the panel, and drilling a hole into the edge of the panel with the guide system and the drill while the force is applied to the face of the panel. The guide system supports a drill having a drill bit for movement in an axial direction. The force is applied to an area of the panel that is in axial alignment with the guide system.

11 Claims, 14 Drawing Sheets

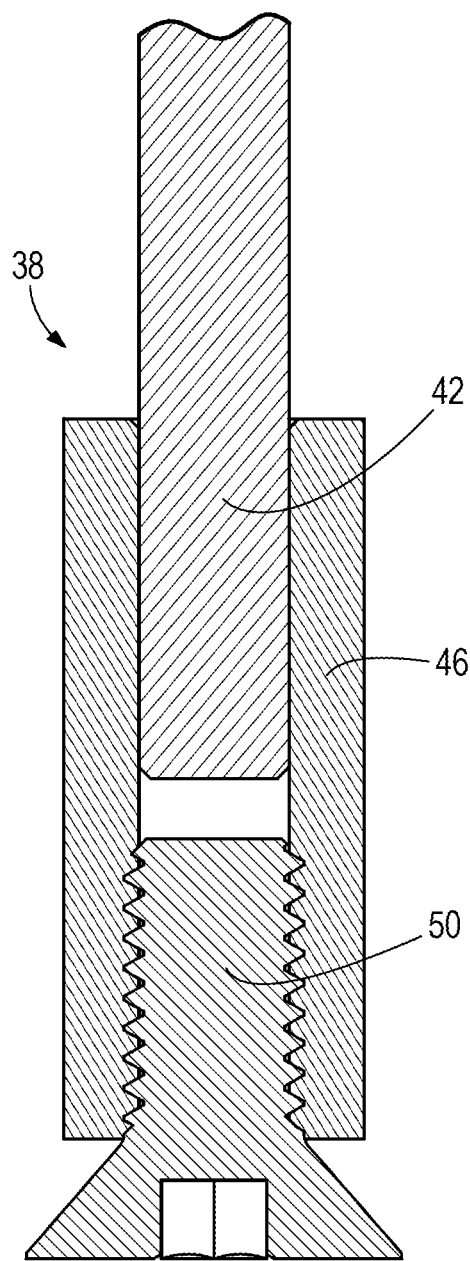
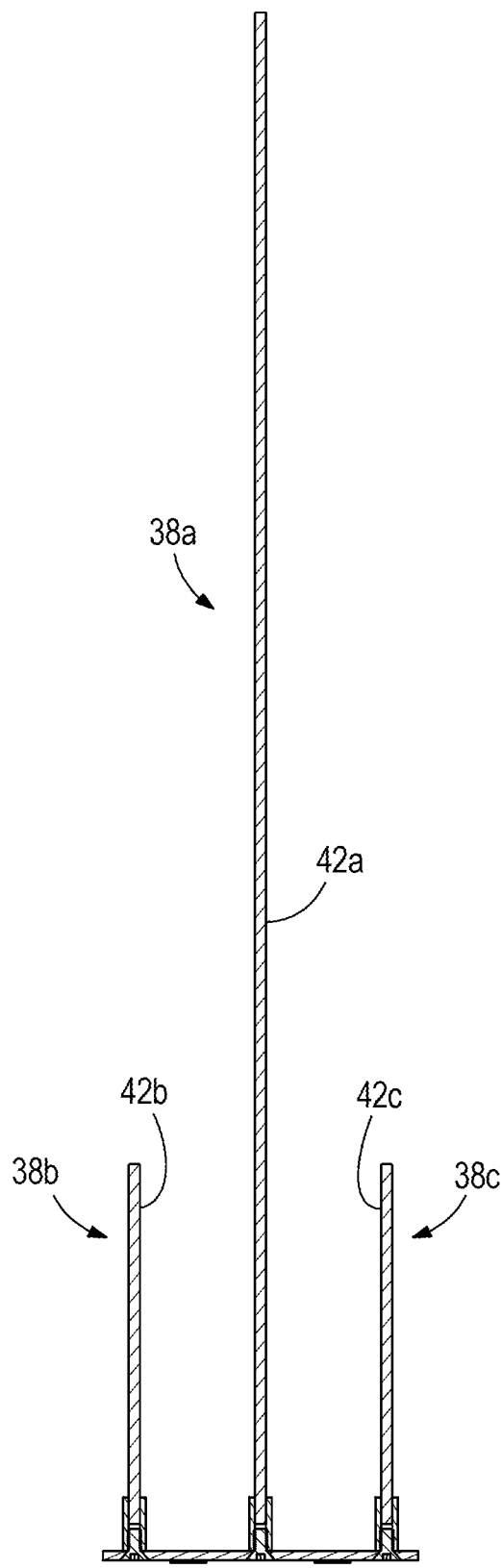
FIG. 5
FIG. 6

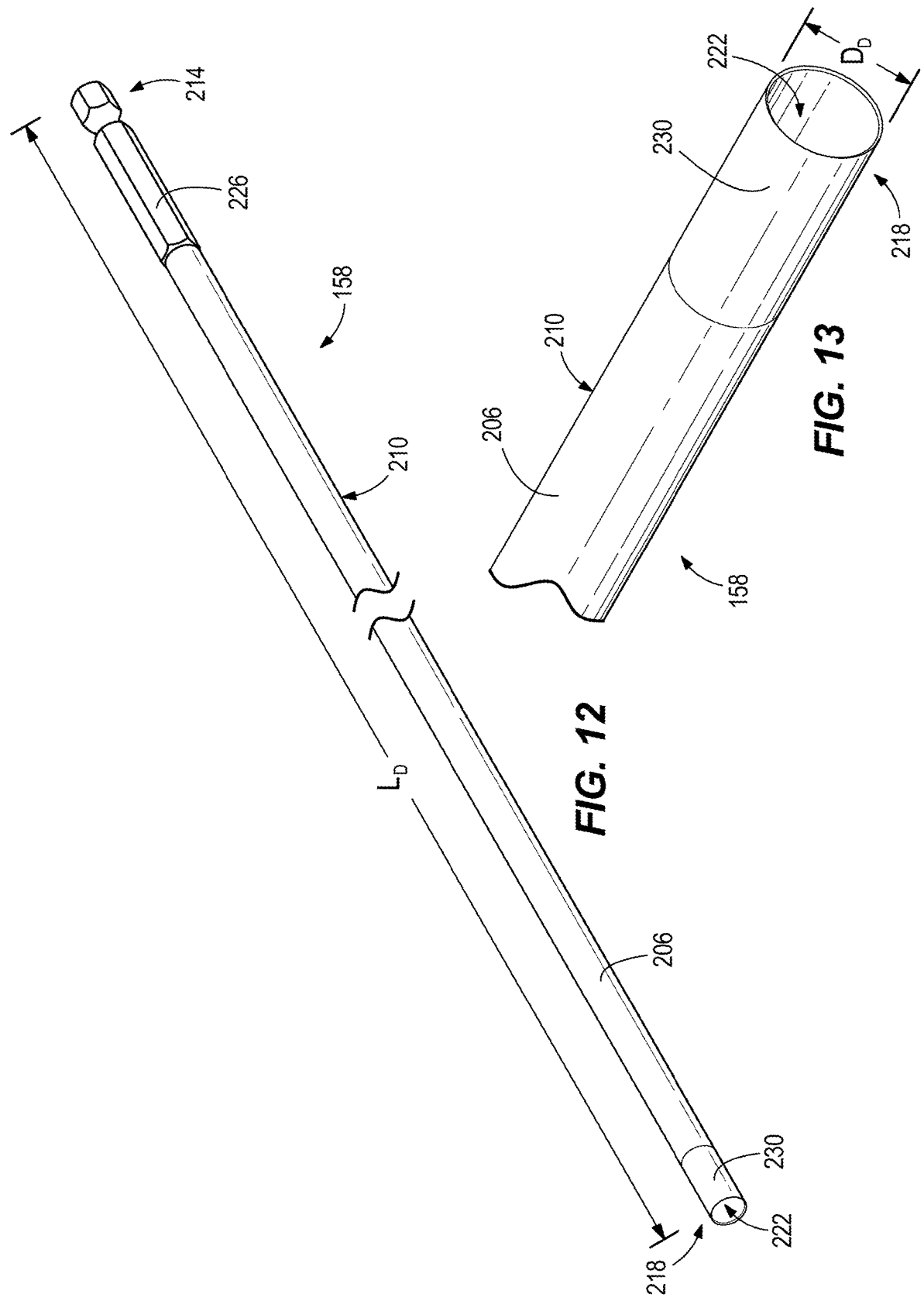

SYSTEM AND METHOD FOR DEEP DRILLING INTO A PET PANEL AND PET PANEL INCLUDING A DEEP DRILLED HOLE

FIELD

The present disclosure relates to PET panels and to methods for deep drilling into PET panels.

BACKGROUND

Panels are used in office settings to separate or divide between individual employee workspaces. In some scenarios, multiple panels may be used to enclose the workspaces as desired. Such panels may require means of assembling to enclose the workspaces. Current panels may use brackets or other attachments on outsides of the panels to assemble together. The attachments are placed on the outside of the panels because consistent and precise hole drilling into relatively thin panels has a low success rate. For example, current drilling methods typically result in holes having undesired extension directions due to drill bit wobble and/or insertion error, among other sources of error.

SUMMARY

In one aspect, the disclosure provides a method for deep drilling into a panel composed of compressed polyester fibers. The panel has an edge and a face. The method includes providing a guide system. The guide system supports a drill having a drill bit for movement in an axial direction. The method also includes aligning the guide system with the panel and applying a force to the face of the panel. The force is applied to an area of the panel that is in axial alignment with the guide system. The method further includes drilling a hole into the edge of the panel with the guide system and the drill while the force is applied to the face of the panel.

In another aspect, the disclosure provides a drilling kit for deep drilling into a panel composed of compressed polyester fibers. The panel has a face and an edge. The drilling kit includes a drill, a drill bit coupled to the drill, and a guide system. The guide system includes a support rail and a guide block configured to be positioned adjacent the edge of the panel. The guide block receives at least a portion of the drill bit to guide movement of the drill bit relative to the panel. The guide system also includes a slider supporting the drill. The slider is movable in an axial direction along the support rail to direct the drill toward and away from the panel. The drilling kit also includes a weight configured to apply a force to the face of the panel. The force is configured to be applied to an area of the panel that is in axial alignment with the guide system.

In another aspect, the disclosure provides a panel including a body composed of compressed polyester fibers. The body has a first face, a second face opposite the first face, a first edge extending between the first face and the second face, and a second edge extending between the first face and the second face. The second edge is opposite the first edge. The body also has a hole drilled through the first edge and extending at least partially toward the second edge. The hole has a diameter and a length. The length is at least 10 times the diameter.

In another aspect, the disclosure provides a drill bit for deep drilling a hole in a panel composed of compressed polyester fibers. The drill bit includes a generally hollow body. The generally hollow body includes a smooth outer surface, a first end configured to be coupled to a drill, and a second end opposite the first end. The second end has a sharpened edge without cutting teeth. The generally hollow body also includes an aperture extending from the second end toward the first end for receiving material removed from the panel during a drilling operation. The generally hollow body has a length that is at least 10 times a diameter of the generally hollow body.

BRIEF DESCRIPTION OF THE DRAWINGS

FIG. 5 is a zoomed in view of a structural insert for the panel of FIG. 1.

FIG. 6 is a front view of a plurality of structural inserts for the panel of FIG. 1.

FIG. 12 is a perspective view of a drill bit for use with the drilling kit of FIG. 10.

FIG. 13 is an enlarged view of a portion of the drill bit of FIG. 12.

DETAILED DESCRIPTION

Before any embodiments of the disclosure are explained in detail, it is to be understood that the invention is not limited in its application to the details of construction and the arrangement of components set forth in the following description or illustrated in the following drawings. The invention is capable of other embodiments and of being practiced or of being carried out in various ways. In addition, terms such as "approximately," "about," and the like associated with values should be understood to encompass rounding and/or manufacturing tolerances associates with the values.

Figure 1:
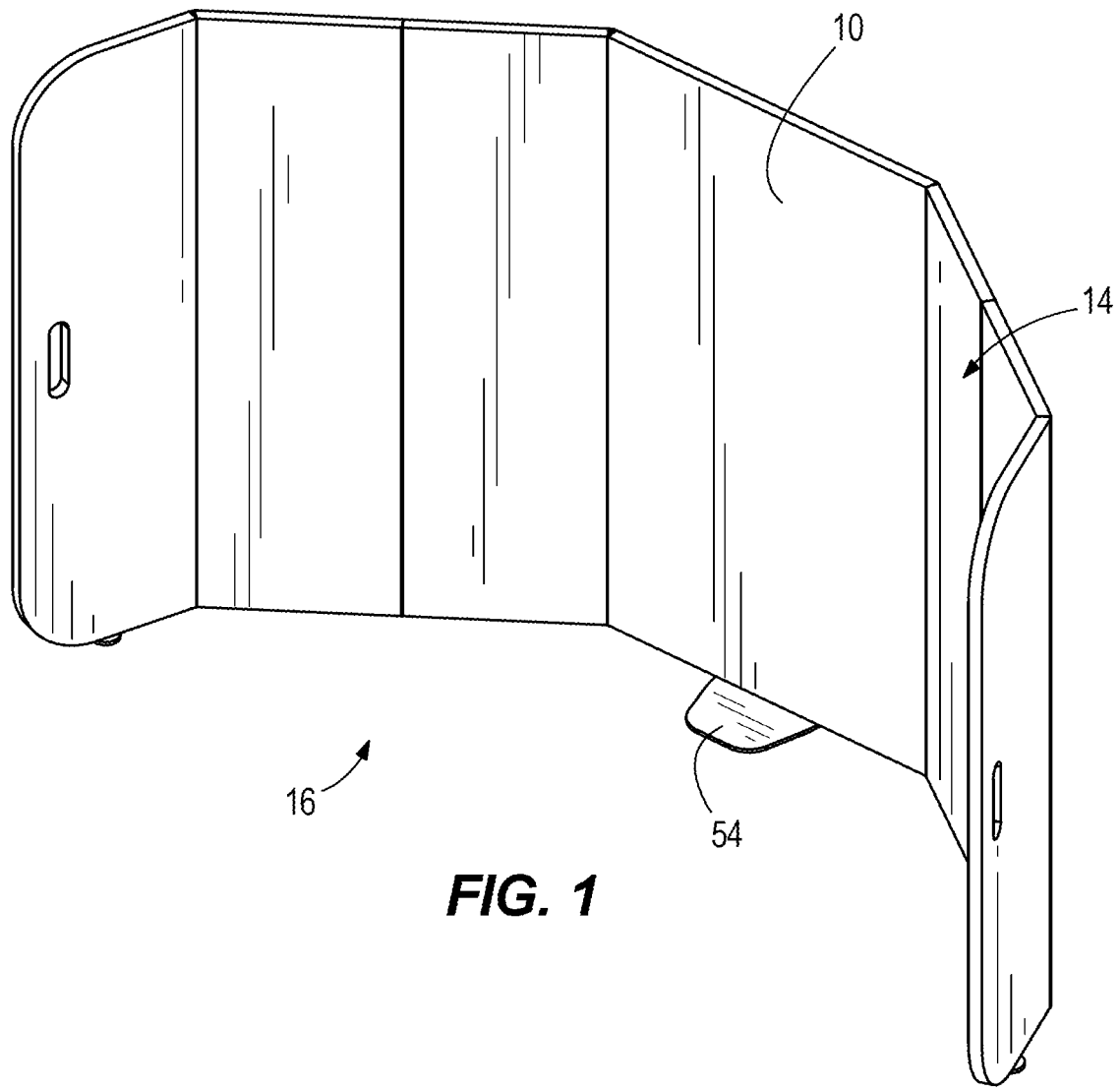
FIG. 1 is a perspective view of a screen including a panel.

FIG. 1 illustrates a screen 14. The illustrated screen 14 includes one or more panels 10. The panels 10 that form the screen 14 are composed of compressed polyester fibers (e.g., compressed polyester staple fibers). As such, the panel 10 is a PET, or polyethylene terephthalate, panel. Although PET is normally a clear plastic, the panel 10 may be composed of compressed PET fibers, making the panel 10 opaque. Additionally, PET is a relatively strong and lightweight plastic. In at least one application, the screen 14 may be used in an office. For example, the screen 14 may be used as a divider for an employee workspace 16 within an office. The screen 14 is operable to block the line of sight into and out of the workspace 16. The screen 14 may also or alternatively be used as a privacy screen, a modesty screen, and/or a room divider that is part of the workspace 16 or that is a standalone screen. As such, the screen 14 may advantageously increase the privacy and reduce distractions for an employee utilizing the workspace 16.

Figure 2:
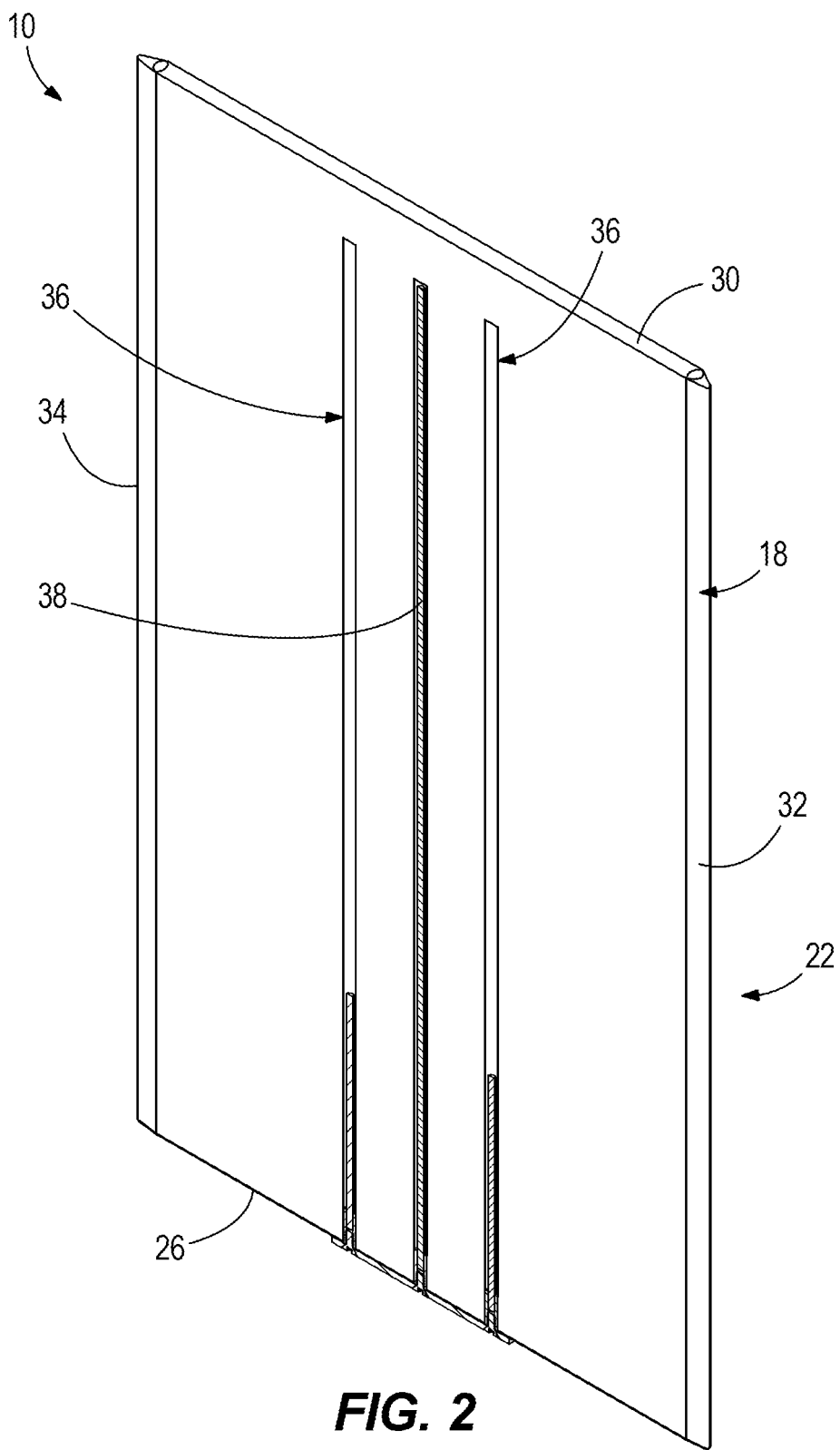
FIG. 2 is a perspective, cross-sectional view of the panel of FIG. 1.

As illustrated in FIG. 2, the panel 10 includes a body 18. The illustrated body 18 is composed of compressed polyester fibers such that the panel 10 is a PET panel. The body 18 includes a first face 20 (FIG. 4), a second face 22, a first edge 26, a second edge 30, a third edge 32, and a fourth edge 34. The first face 20 is positioned opposite the second face 22. The first edge 26 extends between the first face 20 and the second face 22. The second edge 30 extends between the first face 20 and the second face 22. The second edge 30 is positioned opposite the first edge 26. The first edge 26 extends parallel to the second edge 30. The third edge 32 and the fourth edge 34 also extend between the first face 20 and the second face 22. Each of the third edge 32 and the fourth edge 34 extends transverse to both the first edge 26 and the second edge 30. The fourth edge 34 is positioned opposite the third edge 32. The fourth edge 34 extends parallel to the third edge 32. In the illustrated embodiment, body 18 of the panel 10 forms a generally rectangular prism. In other embodiments, the body 18 of the panel 10 may form a panel 10 that has a different shape such as, but not limited to, a cylinder, a triangular prism, a semi-circular prism, a trapezoidal prism, a square prism, or the like. In such embodiments, the panel 10 may include fewer or more edges than the body 18 of the illustrated embodiment. For example, in the embodiment in which the body 18 forms a semi-circular prism, the panel includes an edge and a curved surface that extends from each end of the edge such that the body only includes two edges.

Figure 3:
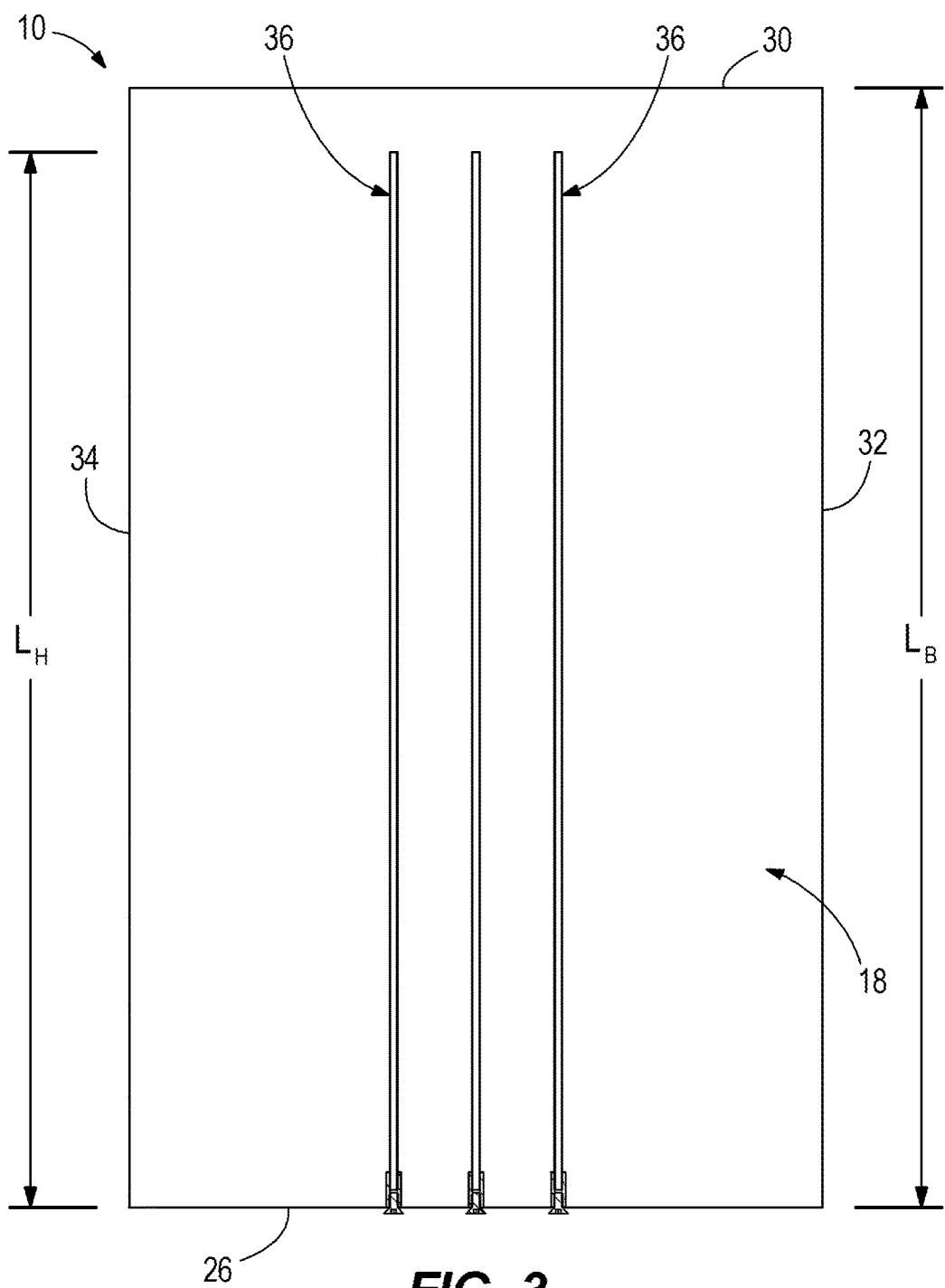
FIG. 3 is a front, cross-sectional view of the panel of FIG. 1.
Figure 4:
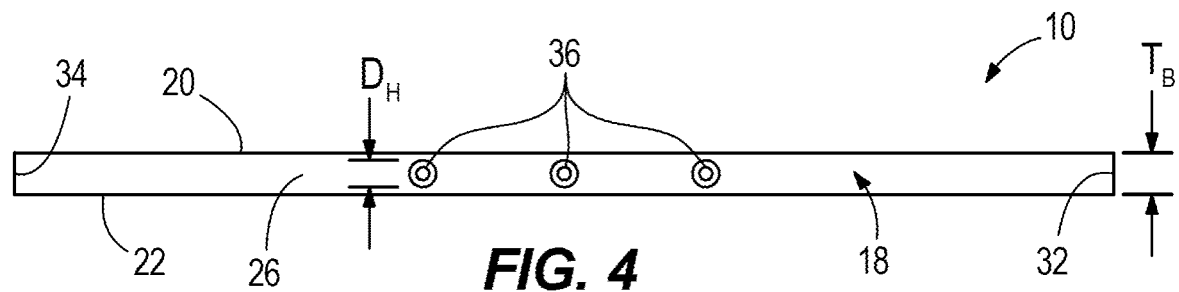
FIG. 4 is a bottom view of the panel of FIG. 1.

With reference to FIGS. 3 and 4, the body 18 of the panel 10 has a body length $L_B$ and a body thickness $T_B$. The distance between the first edge 26 and the second edge 30 defines the body length $L_B$. In some embodiments, the body length $L_B$ may be at least 1 foot. In other embodiments, the body length $L_B$ may be at least 3 feet. In still other embodiments, the body length $L_B$ may be more than 3 feet. The distance between the first face 20 and the second face 22 defines the body thickness $T_B$. In some embodiments, the body thickness $T_B$ may be at least 0.5 inches. In other embodiments, the body thickness $T_B$ may be less than 1 inch. In the illustrated embodiment, the body thickness $T_P$ may be between 0.5 inches and 1 inch. In other embodiments, the body thickness $T_B$ of the body may be less than 0.5 inches. In further embodiments, the body thickness $T_B$ may be greater than 1 inch.

The panel 10 further includes a hole 36. The hole 36 is drilled through the first edge 26 and extends at least partially toward the second edge 30. The hole 36 is formed by a drilling process as further described below. In the illustrated embodiment, the hole 36 extends from the first edge 26 toward the second edge 30 in a direction perpendicular to the extension direction of the first edge 26. Stated another way, the hole 36 extends from the first edge 26 toward the second edge 30 along a direction defined by the shortest distance between the first edge 26 and the second edge 30. In other embodiments, the hole 36 may extend from the first edge 26 toward the second edge 30 along a direction that is not perpendicular to the extension direction of the first edge 26. For example, the hole 36 may extend diagonally (i.e., extend at an angle with the first edge 26 that is not 90 degrees) from the first edge 26.

In the illustrated embodiment, the panel 10 includes three holes 36. In other embodiments, the panel 10 may include fewer or more holes 36. For example, the panel 10 may include a single hole 36 or may include more than three holes 36. The illustrated holes 36 all extend from the first edge 26 toward the second edge 30. As such, the holes 36 are generally parallel to each other. In other embodiments, the holes 36 may extend from different edges (e.g., one hole may extend from the first edge 26 and another hole may extend from the second edge 30). Additionally or alternatively, the holes 36 may be non-parallel to each other. The holes 36 may have the same length or may have different lengths.

The hole 36 has a hole diameter $D_H$ and a hole length $L_H$. In some embodiments, the hole diameter $D_H$ may be 5/16 inch (i.e., 0.3125 inches). In other embodiments, the hole diameter $D_H$ may be ½ inch (i.e., 0.5 inches). In still other embodiments, the hole diameter $D_H$ may be between 5/16 and ½ inches. In further embodiments, the hole diameter $D_H$ may be less than 5/16 inch. In even further embodiments, the hole diameter $D_H$ may be greater than ½ inch. The hole length $L_H$ is significantly greater than the hole diameter $D_H$. In some embodiments, the hole length $L_H$ may be at least 6 inches. In other embodiments, the hole length $L_H$ may be at least 12 inches. In still other embodiments, the hole length $L_H$ may be at least 18 inches. In further embodiments, the hole length $L_H$ may be at least 24 inches. In some embodiments, the hole length $L_H$ may be up to 60 inches. In other embodiments, the hole length $L_H$ may be any value between 6 inches and 60 inches. In further embodiments, the hole length $L_H$ may be greater than 60 inches.

The hole length $L_H$ may be at least 10 times the hole diameter $D_H$. In some embodiments, the hole length $L_H$ may be at least 12 times the hole diameter $D_H$. In other embodiments, the hole length $L_H$ may be at least 15 times the hole diameter $D_H$. In still other embodiments, the hole length $L_H$ may be at least 20 times the hole diameter $D_H$. In further embodiments, the hole length $L_H$ may be between 10 times and 20 times the hole diameter $D_H$. In some embodiments, the hole length $L_H$ may at least one fourth of the body length $L_B$ of the body 18 of the panel 10. In other embodiments, the hole length $L_H$ may be at least one half of the body length $L_B$. In still other embodiments, the hole length $L_H$ may be at least three-fourths of the body length $L_B$. In some embodiments, the hole length $L_H$ may be between one fourth and three-fourths the body length $L_B$. Stated another way, in some embodiments, the hole length $L_H$ may be at least 25% of the body length $L_B$. In other embodiments, the hole length $L_H$ may be at least 50% of the body length $L_B$. In still other embodiments, the hole length $L_H$ may be more than 75% of the body length $L_B$. In further embodiments, the hole length $L_H$ may be up to 90% of the body length $L_B$. In some embodiments, the hole length $L_H$ may be between 25% and 75% of the body length $L_B$. In other embodiments, the hole length $L_H$ may be between 25% and 90% of the body length $L_B$.

In some embodiments, the hole diameter $D_H$ may be at least 30% of the thickness $T_B$ of the body 18 of the panel 10. In other embodiments, the hole diameter $D_H$ may be at least 50% of the body thickness $T_B$. In still other embodiments, the hole diameter $D_H$ may be at least 60% of the body thickness $T_B$. In further embodiments, the hole diameter $D_H$ may be between 30% and 75% of the body thickness $T_B$.

With reference to FIG. 5, the hole 36 (FIG. 3) is configured to receive a structural insert 38 to help support the panel 10 and/or connect the panel 10 to another structure. The illustrated structural insert 38 is a rod assembly. The structural insert 38 includes a rod 42, a coupling 46, and a threaded stand 50. The rod 42 is slidably received in the coupling 46. The threaded stand 50 is threadedly received in the coupling 46. In embodiments where the panel 10 includes multiple holes 36, each hole may receive a structural insert. For example, as shown in FIG. 6, three structural inserts 38a, 38b, 38c may be received in the panel 10 (FIG. 3) including three holes 36. Each of the three holes 36 receives a corresponding one of the three structural inserts 38a, 38b, 38c of FIG. 6. As illustrated in FIG. 6, the three structural inserts 38a, 38b, 38c include a middle structural insert 38a and two outer structural inserts 38b, 38c. The middle structural insert 38a includes a rod 42a that has a longer length than rods 42b, 42c of the two outer structural inserts 38b, 38c. In other embodiments, the structural insert 38 may have other configurations for compatibility with the hole 36 of FIG. 3. For example, the structural insert 38 may have a different rod assembly structure to couple multiple panels 10 together.

Returning reference to FIG. 1, the workspace 16 includes the screen 14 and a stand 54. The screen 14 includes five panels 10, each of which may include one or more of the holes 36 described above. The panels 10 are angled relative to each other. When not in use, the panels 10 may be folded together to reduce the carrying size of the screen 14 for transportation purposes. The stand 54 is placeable on a surface, such as a desk, to prop up the screen 14. The screen 14, therefore, functions as a divider for the workspace 16 and may reduce distractions for a worker.

Figure 7:
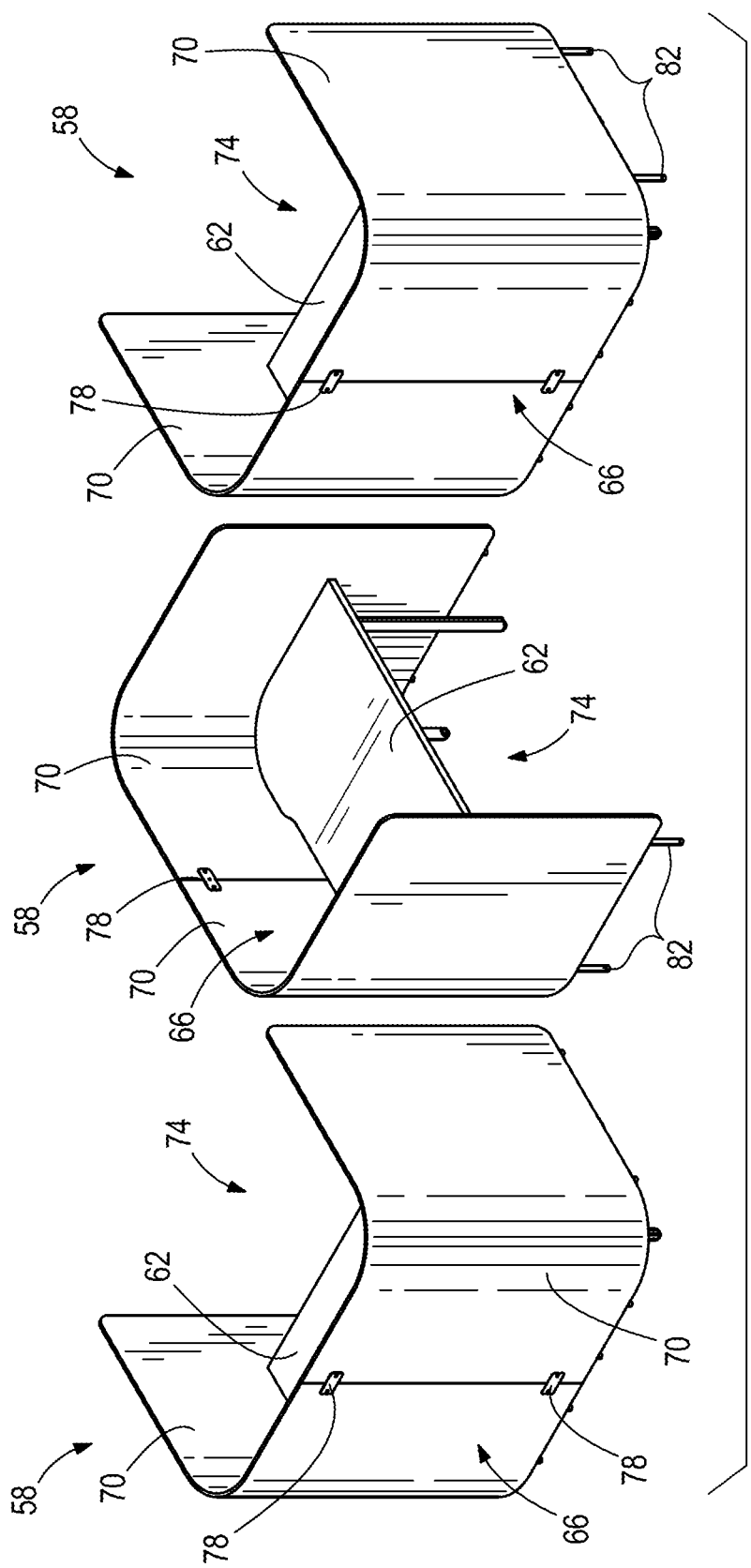
FIG. 7 is a perspective view of a plurality of workspaces including screens according to another embodiment of the disclosure.

FIG. 7 illustrates a plurality of workspaces 58 according to another embodiment of the disclosure. Many components of the illustrated workspaces 58 are similar to the workspace 16 described above with reference to FIGS. 1-6. For the sake of brevity, only the differences of the workspaces 16, 58 are explained below. Each of the workspaces 58 includes a desk 62 and a screen 66. The screen 66 has two panels 70. The panels 70 may be similar to the panel 10 described above. The screen 66 surrounds the desk 62 and provides a worker opening 74. Each of the two panels 70 curves ninety degrees to extend around a corner of the desk 62. The panels 70 meet at a side of the desk 62 opposite the worker opening 74. The screen 66 further includes couplings 78 between the panels 70. Specifically, the screen 66 includes two couplings 78. The couplings 78 secure the two panels 70 together to surround the desk 62. The couplings 78 extend between the panels 70 at the point where the panels 70 meet. The panels 70 additionally receive structural inserts 82 that engage a ground surface to support the screen 66 from the ground surface.

Figure 8:
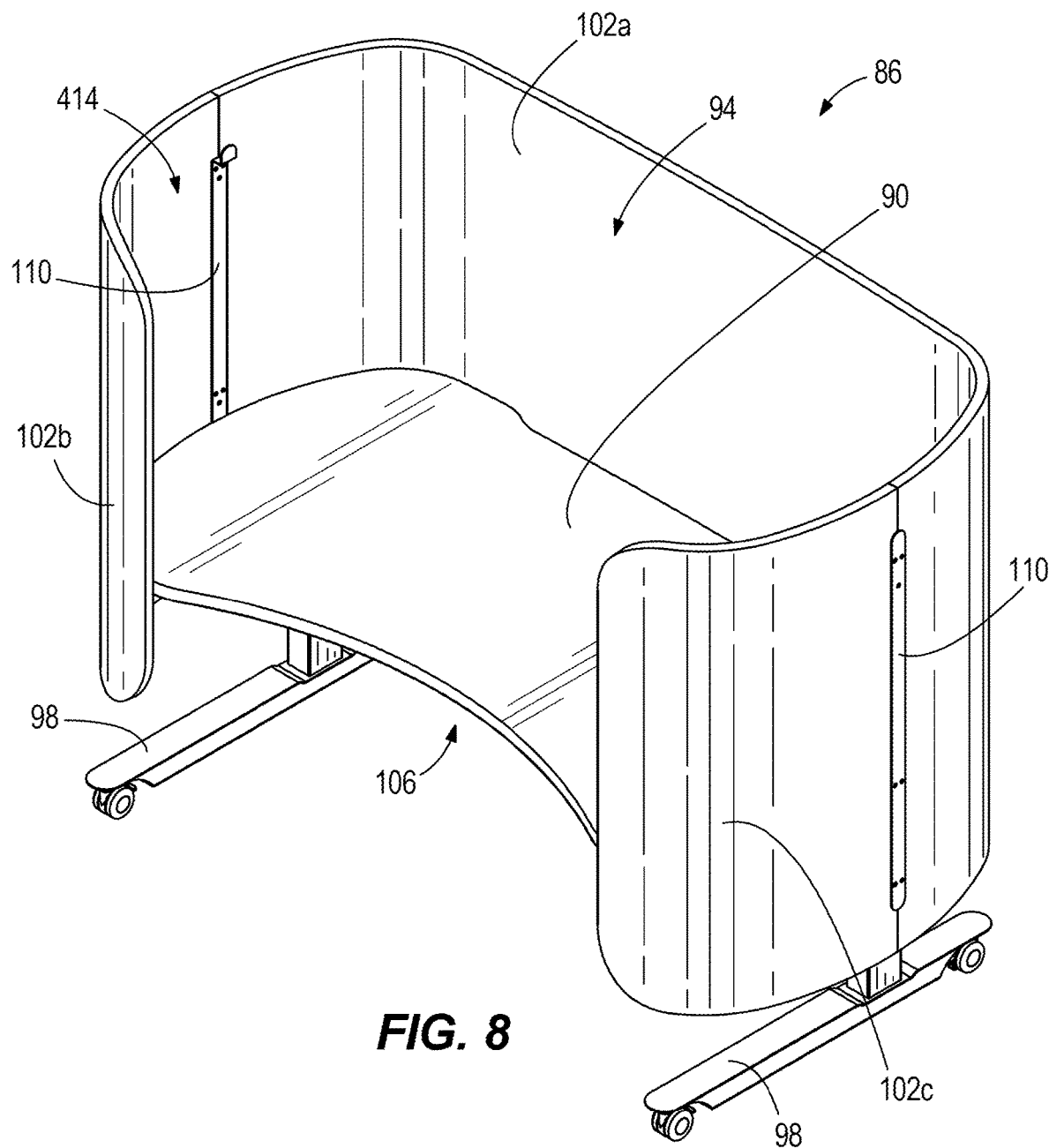
FIG. 8 is a perspective view of a workspace including a screen according to yet another embodiment of the disclosure.

FIG. 8 illustrates a workspace 86 according to another embodiment of the disclosure. Many components of the illustrated workspace 86 are similar to the workspaces 16, 58 described above with reference to FIGS. 1-6 and FIG. 7 respectively. For the sake of brevity, only the differences of the workspaces 16, 58, 86 are explained below. The workspace 86 includes a desk 90 and a screen 94. The desk 90 includes wheeled support stands 98 for improving the ease of mobility of the workspace 86. The wheeled support stands 98 may allow a user to easily push the workspace 86 to a desired location. The screen 94 includes three panels 102a, 102b, 102c. Each panel 102a, 102, 102c may be similar to the panel 10 described above. The screen 94 surrounds the desk 90 and provides a worker opening 106. A first panel 102a is positioned opposite the worker opening 106 and curves about the desk 90 at a position adjacent the wheeled support stands 98. A second panel 102b is coupled to the first panel 102a at a position adjacent one of the wheeled support stands 98, and a third panel 102c is coupled to the first panel 102a at a position adjacent the other of the wheeled support stands 98. The workspace 86 includes longitudinal couplings 110. A corresponding coupling 110 extends along each edge of the first panel 102a that is touching, or adjacent to, a respective edge of the second panel 102b and the third panel 102c to couple the second panel 102b and the third panel 102c to the first panel 102a.

Figure 9:
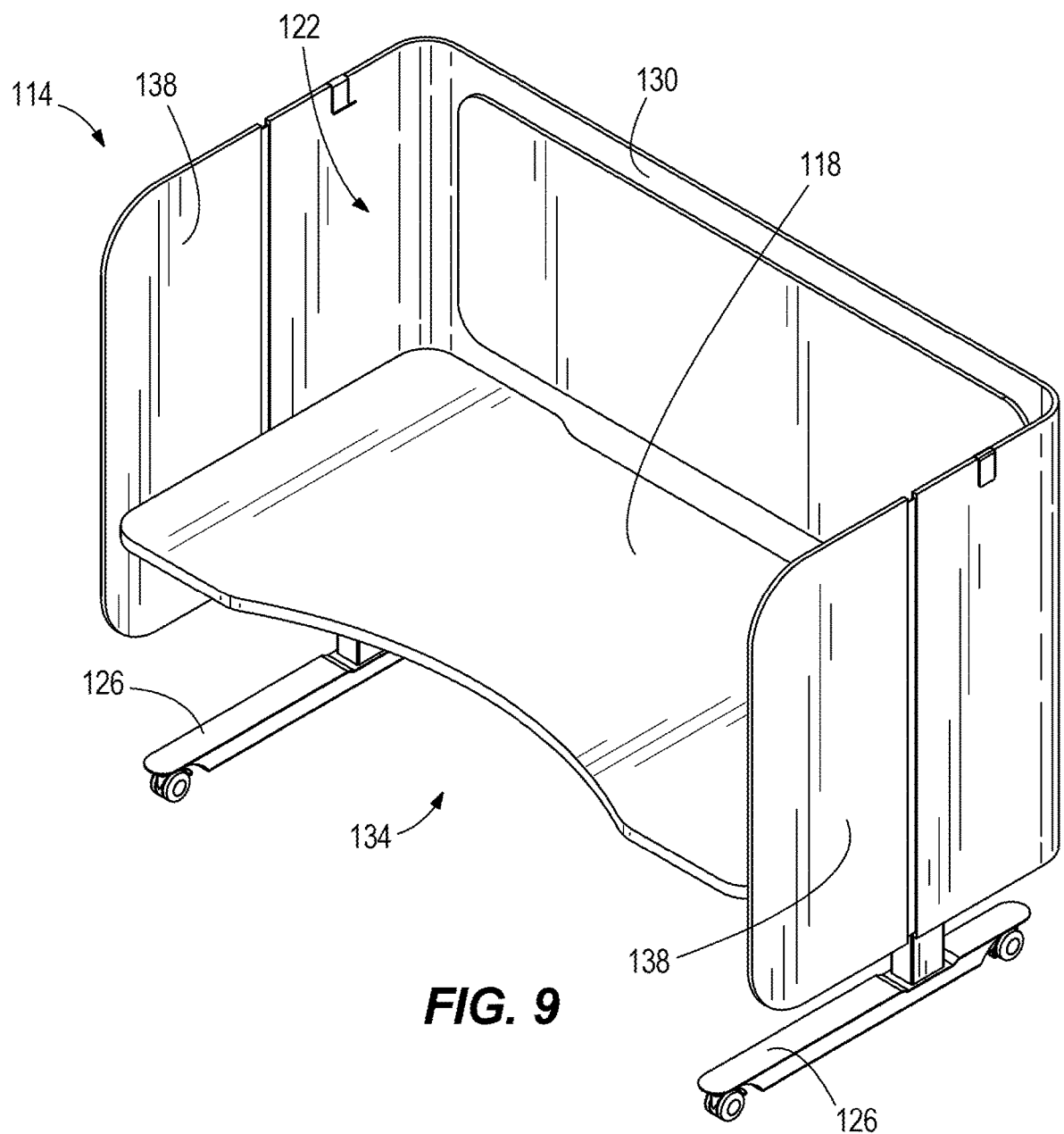
FIG. 9 is a perspective view of a workspace including a screen according to even yet another embodiment of the disclosure.

FIG. 9 illustrates a workspace 114 according to another embodiment of the disclosure. Many components of the illustrated workspace 114 are similar to the workspaces 16, 58, 86 described above with reference to FIGS. 1-6, FIG. 7, and FIG. 8 respectively. For the sake of brevity, only the differences of the workspaces 16, 58, 86, 114 are explained below. The workspace 114 includes a desk 118 and a screen 122. The desk 118 includes wheeled support stands 126 for improving the ease of mobility of the workspace 114. The screen 122 includes a panel 130 that curves around the desk 118 to provide a worker opening 134. The panel 130 may be similar to the panel 10 described above. The panel 130 is foldable at panel flaps 138. When folded outwards, the panel flaps 138 extend substantially linearly from the panel 130. The panel flaps 138 additionally extend substantially linearly along the wheeled support stands 126. When folded together, the screen 122 may improve ease of transportation and therefore allow a user to move the screen 122 to different desks 118.

Figure 10:
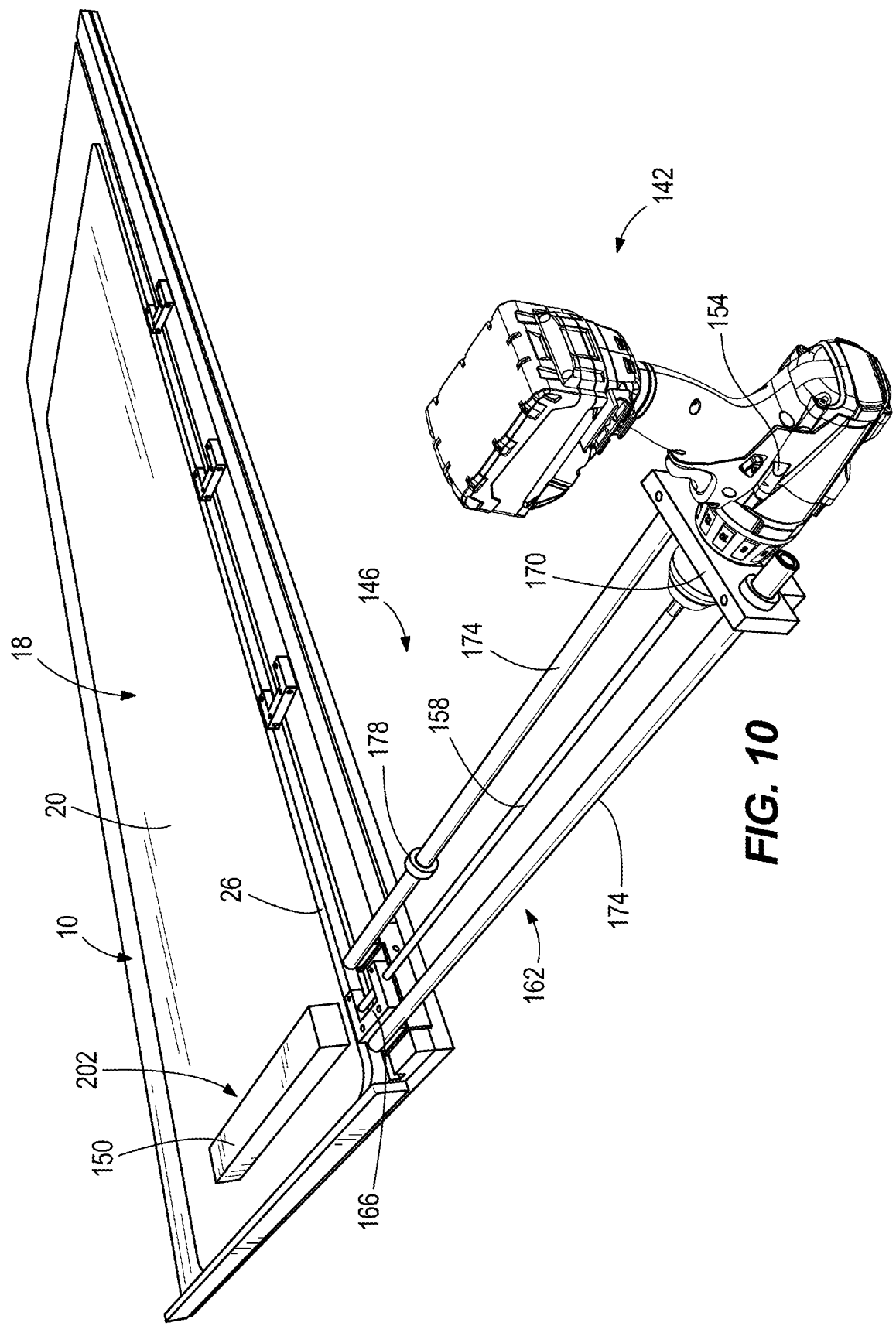
FIG. 10 is a perspective view of a drilling kit for deep drilling a hole into a panel according to any of the embodiments of the disclosure.

FIG. 10 illustrates a drilling kit 142 for drilling into the panel 10. The drilling kit 142 includes a guide system 146, a weight 150, a drill 154, and a drill bit 158 coupled to the drill 154. The guide system 146 includes a support rail 162, a guide block 166, and a slider 170. The guide system 146 supports the drill 154 and the drill bit 158 for movement in an axial direction. The axial direction is perpendicular to the first edge 26 of the panel 10. In the illustrated embodiment, the support rail 162 includes two bars 174. The bars 174 may also be referred to as elongated bars 174. The illustrated bars 174 are cylindrical, but may alternatively have other shapes. The bars 174 are spaced apart to fit the drill 154 therebetween. The guide system 146 further includes a stopper 178. The stopper 178 may be formed of rubber, metal, or another similar material. For example, the stopper 178 may be an O-ring or other type of ring. The stopper 178 is slidably received on one of the bars 174. The stopper 178 is slidable along the guide system 146 to allow a user to set the maximum distance the drill bit 158 may be inserted into the panel 10. In the illustrated embodiment, the guide system 146 includes just one stopper 178 slidably received on one of the bars 174. In some embodiments, the guide system 146 may include two stoppers 178, each stopper 178 slidably received on one of the bars 174. In further embodiments, the stopper 178 may have a different configuration or geometric shape for limiting insertion of the drill bit 158 into the panel 10.

Figure 11:
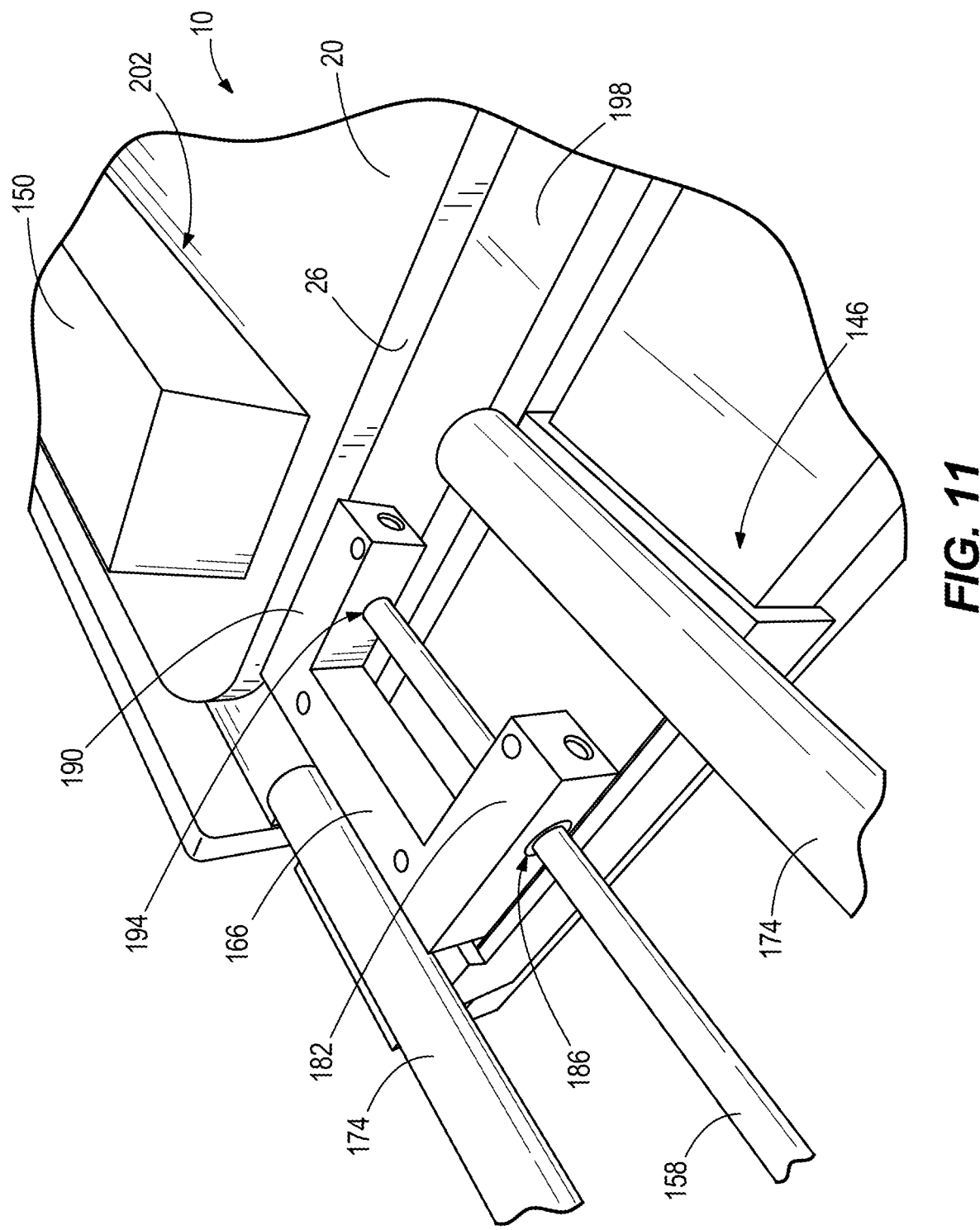
FIG. 11 is an enlarged perspective view of a portion of the drilling kit of FIG. 10.

As illustrated in FIG. 11, the guide block 166 is configured to be positioned adjacent the first edge 26 of the panel 10. Although the guide block 166 is described as positioned adjacent the first edge 26, the guide block 166 may be positioned adjacent any edge of the panel 10 into which a user desires to drill. The guide block 166 receives at least a portion of the drill bit 158 to guide movement of the drill bit 158. Specifically, the guide block 166 is a c-block including a first receiving portion 182 having a first bit receiving aperture 186 and a second receiving portion 190 having a second bit receiving aperture 194. The user may push the drill bit 158 through the first bit receiving aperture 186 in the first receiving portion 182, the second bit receiving aperture 194 in the second receiving portion 190, and into the first edge 26 of the panel 10 to begin drilling the hole 36 (FIG. 2). The guide block 166 improves and maintains alignment of the drill bit 158 as the drill bit 158 is inserted into the panel 10. The drilling kit 142 may further include a clamp configured to clamp the guide block 166 on a table 198, thereby inhibiting movement of the guide block 166 relative to the panel 10.

Returning reference to FIG. 10, in the illustrated embodiment, the slider 170 receives the drill 154 and is slidably received on each of the two cylindrical bars 174. With the slider 170 received on the cylindrical bars 174, and thus the support rail 162, and the drill 154 received in the slider 170, a user may then slide the slider 170 along the support rail 162 to insert the drill bit 158 into the first edge 26 of the panel 10. The slider 170 is slidable along the support rail 162 toward the first edge 26 of the panel 10 until the slider 170 reaches the stopper 178, at which point the slider 170 is inhibited from traveling further in the direction of the first edge 26 of the panel 10.

The weight 150 is a mass of material that can be placed on the panel 10. In the illustrated embodiment, the weight 150 is a roughly rectangular prism bar. In some embodiments, the weight 150 may be at least 20 pounds. In other embodiments, the weight 150 may be at most 30 pounds. In further embodiments, the weight 150 may be between 20 pounds and 30 pounds. In the illustrated embodiment, the weight 150 is approximately 25 pounds. In other embodiments, the weight 150 may be less than 20 pounds. In further embodiments, the weight 150 may be more than 30 pounds. The weight 150 may be formed of iron, brass, or another similarly dense metal. Alternatively, the weight 150 may be formed of a ceramic material such as porcelain. The panel 10 is oriented parallel to the ground such that a user may place the weight 150 on the first face 20 of the panel 10. Specifically, a user may place the weight 150 on an area 202 of the first face 20 of the panel 10 that is in axial alignment with the guide system 146. The weight 150 is configured to apply a force to the area 202 of the first face 20 of the panel 10. Although the drilling kit 142 of the illustrated embodiment utilizes the weight 150 to apply the force to the area 202 of the panel 10, the drilling kit 142 may be operable with any other means of applying an adequate force to the area 202 of the panel 10. For example, the drilling kit 142 may include a hydraulic press that applies a force to the area 202 of the panel 10. In such examples, the panel 10 may be positioned such that the first face 20 and the second face 22 may extend perpendicular to the ground. Stated another way, the panel 10 may be vertically oriented relative to the ground. As such, the hydraulic press may engage/clamp the panel 10 at each of the first face 20 and the second face 22 to provide the force to the area 202 of the panel 10. In examples in which a hydraulic press, or any other suitable means for applying a force to the panel 10, is used in place of the weight 150, the first face 20 and the second face 22 of the panel 10 may be oriented horizontally, vertically, diagonally, or in any other position relative to the ground.

In the illustrated embodiment, the drill 154 is a conventional drill that may be purchased from an outside supplier of power tools. In other embodiments, the drill 154 may be a dedicated drill specifically designed for the drilling kit 142. The drill 154 is configured to receive and drive the drill bit 158. The illustrated drill 154 is battery powered. In other embodiments, the drill 154 may have a cord for connecting to an external power source.

FIGS. 12 and 13 illustrate the drill bit 158. The drill bit 158 includes a generally hollow body 206 having a smooth outer surface 210, a drill bit length $L_D$, a drill bit diameter $D_D$, a first end 214, a second end 218, and an aperture 222. The aperture 222 extends from the second end 218 and through the generally hollow body 206. In the illustrated embodiment, the generally hollow body 206 of the drill bit 158 is at most 0.02 inches thick. Specifically, the generally hollow body 206 of the drill bit 158 is 0.013 inches thick. In other embodiments, the generally hollow body 206 of the drill bit 158 is greater than 0.02 inches thick.

The drill bit length $L_D$ extends between the first end 214 and the second end 218. In some embodiments, the drill bit length $L_D$ is at least 6 inches. In other embodiments, the drill bit length $L_D$ is at least 1 foot. In still other embodiments, the drill bit length $L_D$ is at least 2 feet. In still other embodiments, the drill bit length $L_D$ is at least 3 feet. In further embodiments, the drill bit length $L_D$ may be up to 5 feet. In some embodiments, the drill bit length $L_D$ may be between 6 inches and 5 feet. In some embodiments, the drill bit length $L_D$ may be between 1 foot and 3 feet. In still other embodiments, the drill bit length $L_D$ may be more than 5 feet.

The drill bit diameter $D_D$ is a maximum outer diameter of the generally hollow body 206, excluding the first end 214 of the drill bit 158. The drill bit diameter $D_D$ is equal to the diameter $D_H$ of the hole 36 (FIG. 3) being drilled into the panel 10. As such, similar to the hole diameter $D_H$, the drill bit diameter $D_D$ may be 5/16 inches, ½ inch, or between 5/16 inches and ½ inch. In addition, the drill bit diameter $D_D$ may be less than 5/16 inches or may be greater than ½ inch. Similarly, the drill bit length $L_D$ may be at least 10 times the drill bit diameter $D_D$, at least 20 times the drill bit diameter $D_D$, or between 10 and 20 times the drill bit diameter $D_D$.

The first end 214 of the drill bit 158 is configured to be coupled to the drill 154 (FIG. 10). Specifically, the drill bit 158 includes a shank 226 at the first end 214 for coupling with the drill 154. In the illustrated embodiment, the shank 226 is a hex shank. In other embodiments, the shank 226 may be any other type of shank for coupling with the drill 154. The second end 218 is positioned opposite the first end 214. The second end 218 has a sharpened edge 230. Specifically, the sharpened edge 230 is tapered. The taper of the sharpened edge 230 enables the drill bit 158 to cut through polyester during operation of the drill bit 158. As such, the sharpened edge 230 has a thickness that is less than the thickness of the rest of the generally hollow body 206. In the illustrated embodiment, the sharpened edge 230 extends approximately 0.75 inches from the second end 218. The sharpened edge 230 does not include cutting teeth. The aperture 222 extends through the second end 218 of the drill bit 158. The aperture 22 extends toward the first end 214 of the drill bit 158, but may end before or at the shank 226. The aperture 222 may receive material removed by the sharpened edge 230 of the drill bit 158 during drilling, as to be further described herein.

Figure 14:
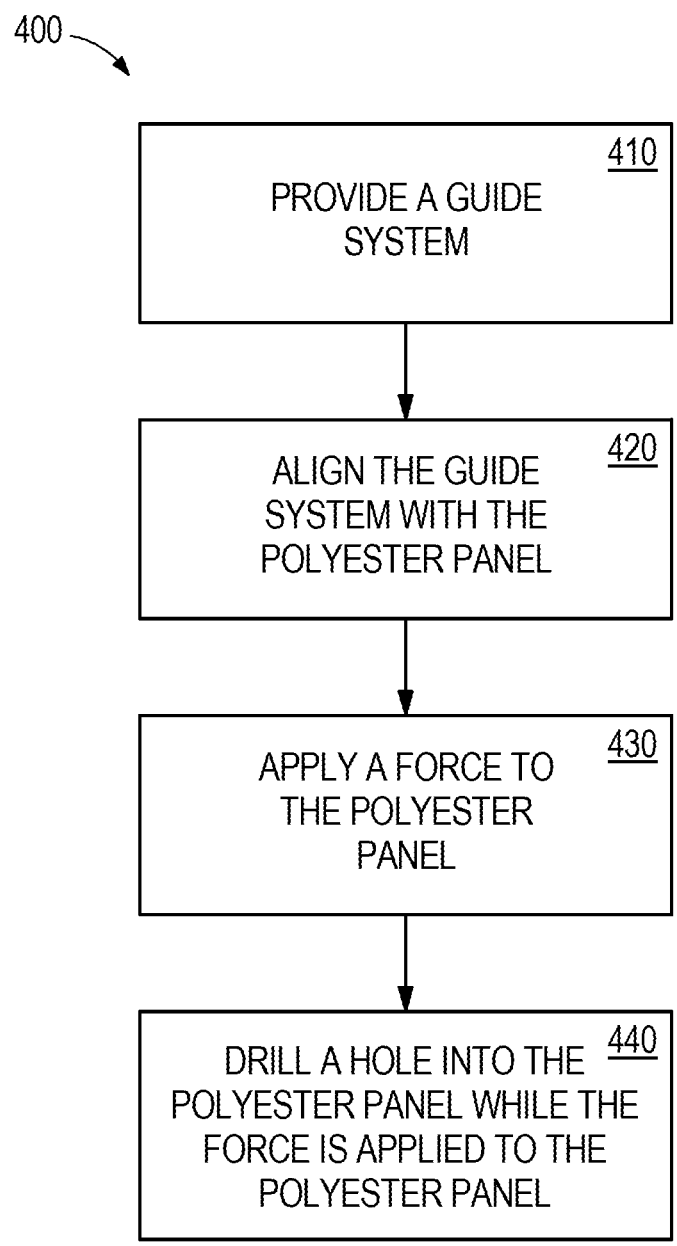
FIG. 14 is a flow chart of a method for deep drilling into a panel.

FIG. 14 illustrates a drilling operation 400. The drilling operation 400 is a method for deep drilling into a panel, such as the panel 10. Although the drilling operation 400 is described with reference to certain steps, not all of the steps need to be performed or need to be performed in the order presented.

At step 410, the drilling operation 400 includes providing the guide system 146 (FIG. 10). The guide system 146 supports the drill 154 having the drill bit 158 for movement in the axial direction. Providing the guide system 146 may include, among other things, providing the support rail 162, positioning the guide block 166 adjacent the first edge 26 of the panel 10, and coupling the slider 170 to the support rail 162.

Figure 15:
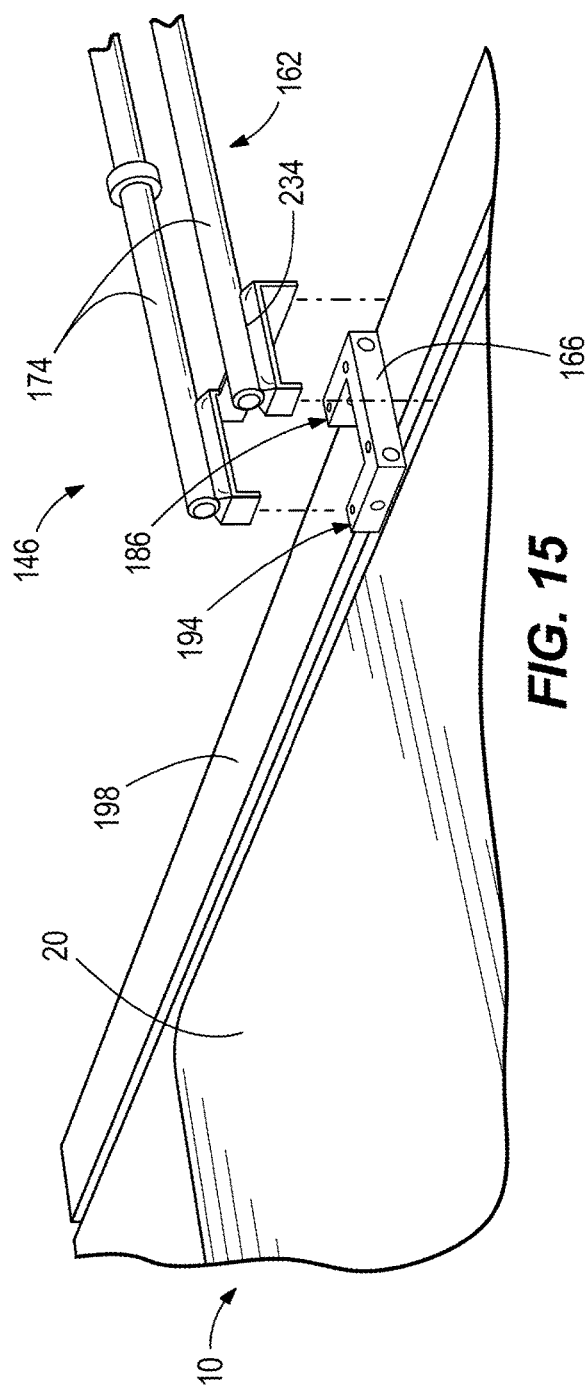
FIG. 15 is a perspective view of providing and aligning a guide system with the panel according to the method of FIG. 14.

At step 420 of the drilling operation 400, a user aligns the guide system 146 with the panel 10. Specifically, as shown in FIG. 15, a user may place the guide system 146 on the table 198, or another similar surface, that supports the panel 10. In the illustrated embodiment, the guide system 146 includes a front support 234 to be placed on the table 198. The front support 234 and the guide block 166 of the guide system 146 are placed on the table 198 to position the support rail 162, and thus the two cylindrical bars 174, and the guide block 166 in alignment with the panel 10. Further, the user may place the first bit receiving aperture 186 and the second bit receiving aperture 194 into alignment with a desired bit hole location for the panel 10. In some embodiments, the user may additionally place a clamp such as a c-clamp in engagement with the guide block 166 and the table 198 to inhibit the guide block 166 from moving relative to the panel 10.

Figure 16:
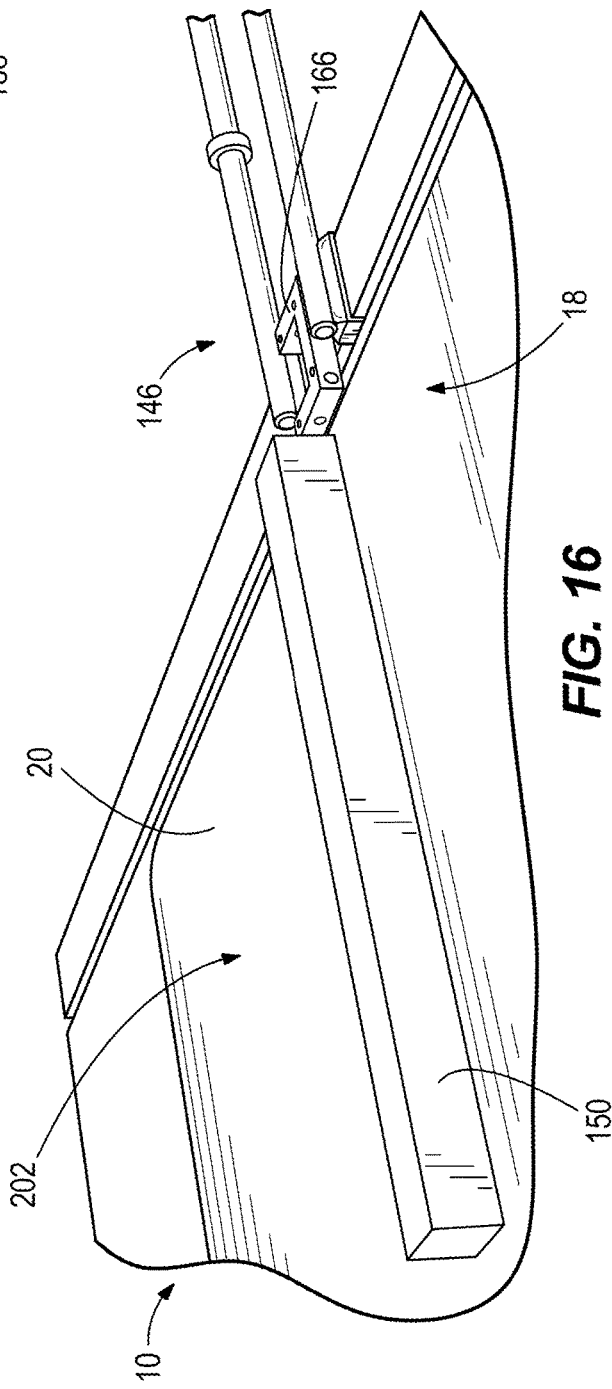
FIG. 16 is a perspective view of applying a force to the panel according to the method of FIG. 14

At step 430 of the drilling operation 400, a force is applied to the face 20 of the panel 10. Specifically, as shown in FIG. 16, a user may place the weight 150 on the panel 10 at the area 202 corresponding to the desired hole location to apply the force to the face 20 of the panel 10. The user specifically places the weight 150 at the area 202 on the first face 20 of the panel 10 that is in axial alignment with the guide system 146. Although the method for deep drilling into the panel 10 of the illustrated embodiment discloses placing the weight 150 on the panel 10 after the guide system 146 has been provided and aligned with the panel 10, a user may alternatively place the weight 150 on the panel 10 before the guide system 146 has been provided and aligned with panel 10. As such, the user may provide and align the guide system 146 with the area 202 that is in axial alignment with the weight 150 in such instances.

The weight 150 provides a force to the area 202 on the first face 20 of the panel 10 that compresses the polyester fibers of the panel 10 to assist in maintaining a constant direction of movement through the body 18 of the panel 10 for the drill bit 158 during drilling. Compressing the panel 10 inhibits the drill bit 158 from traveling away from an intended path during drilling. In absence of the weight 150, the fibers are not compressed, which provides relatively less resistance for the drill bit 158 such that the drill bit 158 may wobble and/or travel off course during drilling. As previously disclosed, the drilling kit 142 (FIG. 10) may be operable with any force providing means that is capable of compressing the polyester fibers of the panel 10.

Figure 17:
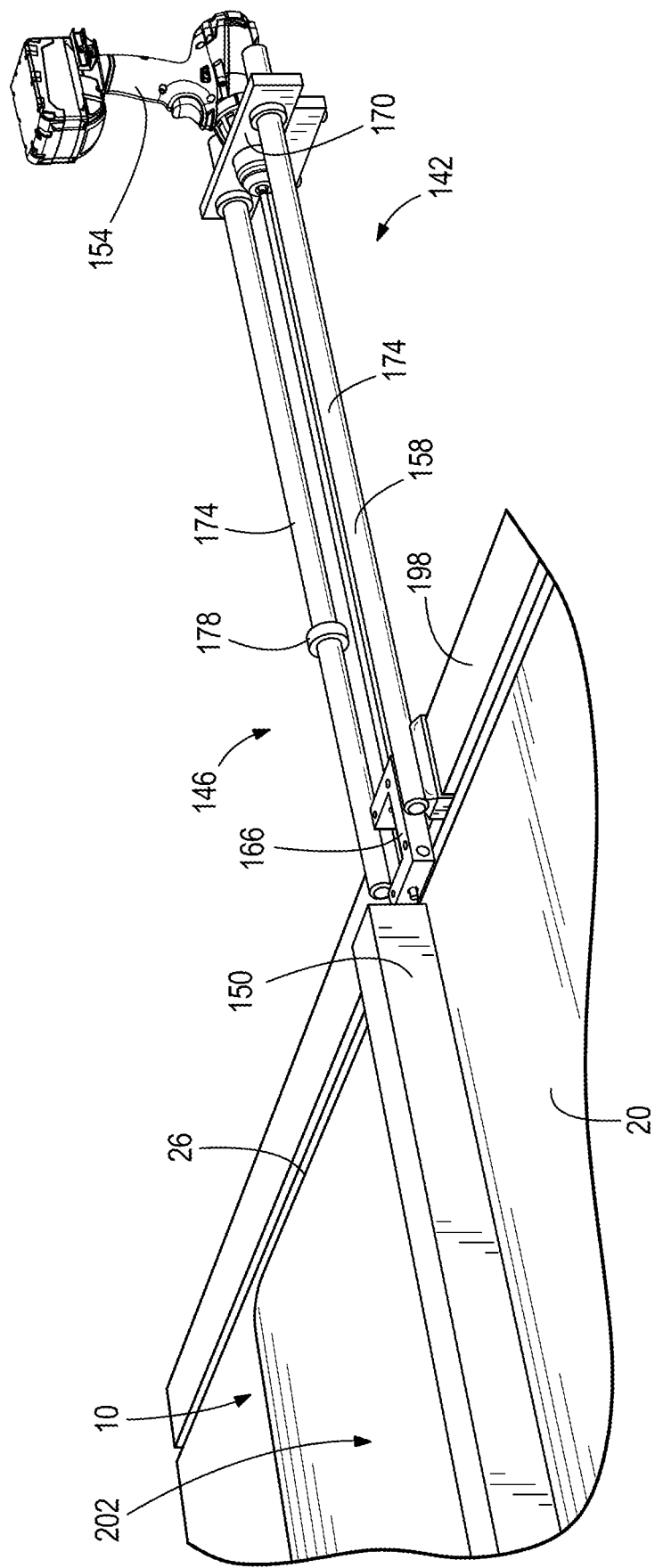
FIG. 17 is a perspective view of a first progression point of drilling a hole into the panel according to the method of FIG. 14.

With reference to FIGS. 16 and 17, prior to step 440, a user may cut a slit into the first face 20 of the panel 10. In alternative embodiments, the slit may be cut into the second face 22 (FIG. 4) of the panel 10. A user may use a paring knife or any other similar cutting tool capable of making a precise and accurate cut to create the slit. In some embodiments, the slit may be at least 0.7 inches long. In other embodiments, the slit may be at most 0.7 inches long. In further embodiments, the slit may have a length that is dependent on the drill bit diameter $D_D$ (FIG. 13). The slit may be cut by the user to extend into the body 18 from the first face 20. In some embodiments, the slit may extend at least 60% into the body 18 from the first face 20. In other embodiments, the slit may extend at least 70% into the body 18 from the first face 20. In further embodiments, the slit may extend at least 80% into the body 18 from the first face 20. In even further embodiments, the slit may extend at least 90% into the body 18 from the first face 20. With additional reference to FIG. 3, the position of the slit may be dependent on an intended hole length $L_H$. For example, if a user intends to drill a hole 36 having a hole length $L_H$ extending 30 inches from the first edge 26 of the panel 10, then the slit may be created, that is, cut, 30 inches from the first edge 26 of the panel 10 in axial alignment with the intended hole 36. In another example, if a user intends to drill a hole 36 having a hole length $L_H$ extending 40 inches from the first edge 26 of the panel 10, then the slit may be created, that is, cut, 40 inches from the first edge 26 of the panel 10 in axial alignment with the intended hole 36.

Figure 18:
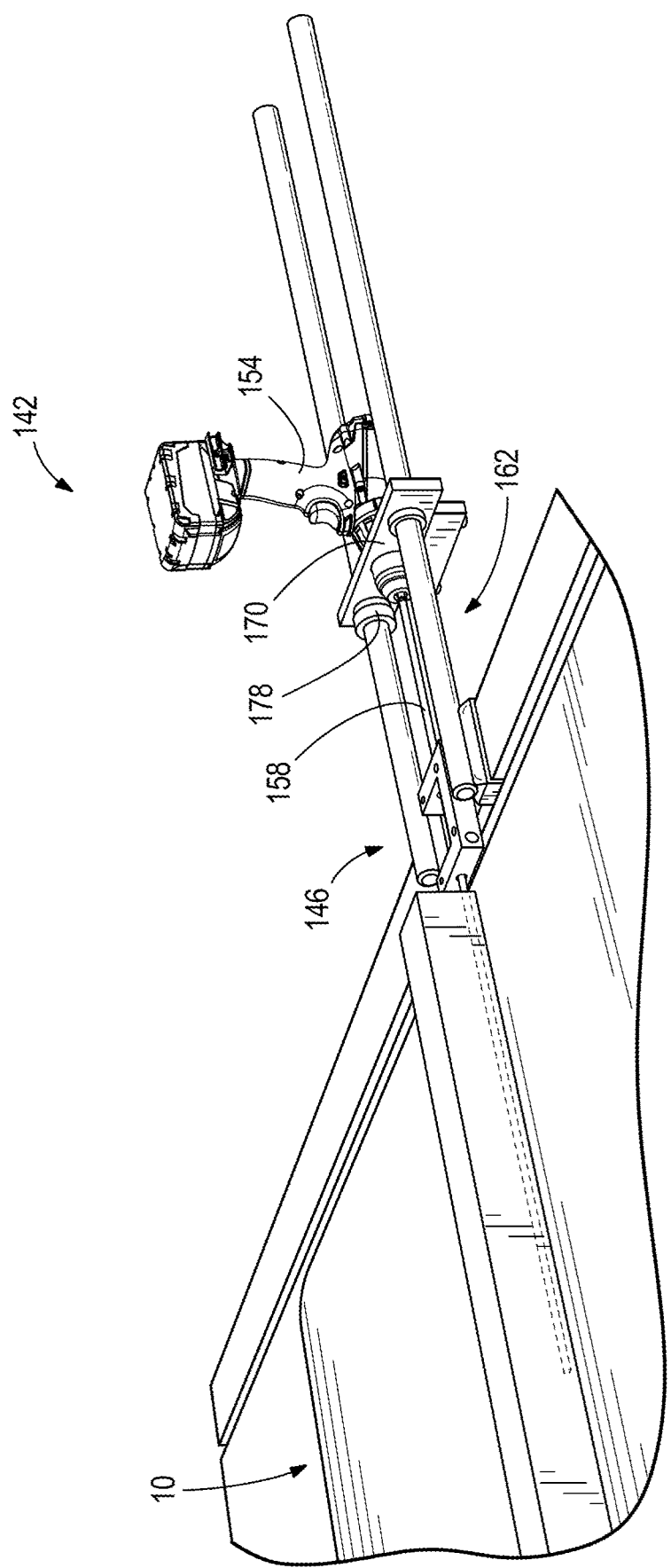
FIG. 18 is a perspective view of a second progression point of drilling the hole into the panel according to the method of FIG. 14.

At step 440 of the drilling operation, the hole 36 (FIG. 3) is drilled into the panel 10. Specifically, as shown in FIGS. 17 and 18, the hole 36 is drilled using the guide system 146 and the drill 154 while the force is applied to the face 20 of the panel 10. To drill the hole 36, a user may push the slider 170 toward the first edge 26 to insert the drill bit 158 into the first edge 26. In some embodiments, the drill bit 158 may be inserted into the first edge 26 of the panel 10 at a rate of approximately 1 inch per second. In some embodiments, the optimal rate of insertion for the drill bit 158 may be less than 1 inch per second. For example, the drill bit 158 may be inserted into the first edge 26 of the panel 10 at a rate of ½ inch per second. In other embodiments, the optimal rate of insertion may be more than 1 inch per second. For example, the drill bit 158 may be inserted into the first edge 26 of the panel 10 at a rate up to 2 inches per second.

Drilling the hole 36 of FIG. 3 further includes rotating the drill bit 158 with the drill 154. In some embodiments, the drill bit 158 may be rotated at a rate of at least 800 rpm. In other embodiments, the drill bit 158 may be rotated at a rate of at most 1100 rpm. In still other embodiments, the drill bit 158 may be rotated at a rate between 800 rpm and 1100 rpm. In the illustrated embodiment, the drill bit 158 may be rotated at a rate of approximately 950 rpm. In other embodiments, the drill bit 158 may be rotated at a rate that is less than 800 rpm. In further embodiments, the drill bit 158 may be rotated at a rate greater than 1100 rpm.

A user may push the slider 170 (and thereby the drill 154) toward the first edge 26 of the panel 10 until the slider 170 reaches the stopper 178. FIG. 18 illustrates the slider 170 as the slider 170 reaches the stopper 178. The stopper 178 inhibits the user from the pushing the slider 170 any further toward the first edge 26 of the panel 10. In other embodiments, the guide system 146 may not include the stopper 178.

Once the drill bit 158 has been inserted a desired distance into the panel 10, the user may pull the drill bit 158 from the panel 10 to remove the drill bit 158 from the panel 10. Once the drill bit 158 has been entirely removed and the drill 154 has been turned off, the user may then remove the slider 170 from the support rail 162 and, additionally or alternatively, remove the drill bit 158 from the slider 170. The user may then remove material from the aperture 222 (FIG. 13) of the drill bit 158. Specifically, with reference to FIG. 13, the drill bit 158 receives, in the aperture 222, polyester fibers drilled (i.e., removed) by the sharpened edge 230 during the drilling operation 400. The slit that is cut into the one of the first face 20 and the second face 22 enables retention of material in the drill bit 158. In the absence of the slit, the material cut by the drill bit 158 would remain connected to the rest of the panel 10 along the axial direction. The slit therefore provides an end of the hole 36 (FIG. 3) in which the material removed during the drilling process is severed from the rest of the panel 10. As such, the slit enables the material to be adequately retained in the drill bit 158 and thus, adequately removed from the panel 10. Returning reference to FIG. 18, with the material removed, the user may move the guide system 146 to a new desired hole location and repeat the drilling operation 400 (FIG. 14), as described here above, to drill as many holes 36 (FIG. 3) as desired in the panel 10.

In some embodiments, multiple holes 36 may be drilled into the panel 10 simultaneously. In such embodiments, multiple drilling kits 142 may be provided to drill the multiple holes 36 (FIG. 3) simultaneously. Alternatively, the support rail 162 and/or the slider 170 may be modified (e.g., elongated) to support multiple drills, which can then drill multiple holes simultaneously.

Although the invention has been described with reference to certain embodiments, variations and modifications exist within the spirit and scope of the invention. Various features of the invention are set forth in the following claims.

What is claimed:

1. A method for deep drilling into a panel composed of compressed polyester fibers, the panel having an edge and a face, the method comprising:
    providing a guide system, the guide system supporting a drill having a drill bit for movement in an axial direction;
    aligning the guide system with the panel;
    placing a weight on the face of the panel, the weight being placed on an area of the panel that is in axial alignment with the guide system and spaced apart from the edge of the panel; and
    drilling a hole into the edge of the panel with the guide system and the drill while the force is applied to the face of the panel,
    wherein the edge of the panel is a first edge, wherein the panel has a second edge opposite the first edge and a length measured between the first edge and the second edge, and wherein placing the weight includes positioning the weight to extend a majority of the length of the panel in axial alignment with the guide system.

2. The method of claim 1, wherein the drill bit includes a hollow body having a smooth outer surface and a sharpened edge without cutting teeth, and wherein drilling the hole includes receiving part of the panel in the generally hollow body.

3. The method of claim 1, wherein drilling the hole includes inserting the drill bit into the edge of the panel at a rate of approximately 1 inch per second.

4. The method of claim 1, wherein drilling the hole includes rotating the drill bit with the drill at a rate of 800 to 1100 rpms.

5. The method of claim 1, wherein drilling the hole into the edge of the panel includes drilling a hole having a length of at least 6 inches.

6. The method of claim 5, wherein the length of the hole is at least 10 times a diameter of the hole.

7. The method of claim 5, wherein the edge of the panel is a first edge, wherein the panel has a second edge opposite the first edge and a length measured between the first edge and the second edge, and wherein the length of the hole is at least half the length of the panel.

8. The method of claim 1, wherein the panel has a thickness between 0.5 inches and 1 inch.

9. The method of claim 1, wherein providing the guide system includes
    providing a support rail,
    positioning a guide block adjacent the edge of the panel, the guide block receiving at least a portion of the drill bit to guide movement of the drill bit relative to the panel, and
    coupling a slider to the support rail, the slider supporting the drill.

10. The method of claim 1, wherein drilling the hole includes moving the slider along the support rail in the axial direction toward the panel.

11. The method of claim 1, wherein the weight is at least 20 pounds.

* * * * *